United States Patent [19]

Taig

[11] 4,186,651
[45] Feb. 5, 1980

[54] HYDRAULIC POWER-ASSISTED ACTUATING ARRANGEMENTS

[75] Inventor: Alistair G. Taig, South Bend, Ind.

[73] Assignee: Bendix Westinghouse Limited, Chippenham, England

[21] Appl. No.: 867,864

[22] Filed: Jan. 9, 1978

[30] Foreign Application Priority Data

Feb. 24, 1977 [GB] United Kingdom ............... 07939/77

[51] Int. Cl.² .......................... F15B 9/10; F01C 9/00; F01B 9/00
[52] U.S. Cl. .................................... 91/375 R; 92/121; 92/136
[58] Field of Search ....................... 91/375 R, 375 A; 92/121, 136

[56] References Cited

U.S. PATENT DOCUMENTS

2,748,881  6/1956  Holly, Jr. .......................... 91/375 R

Primary Examiner—Paul E. Maslousky
Attorney, Agent, or Firm—Paul D. Schoenle; Ken C. Decker

[57] ABSTRACT

An hydro-mechanical torque amplifier such as a power steering unit for road vehicles. In the prior art, torque amplifying hydraulic pressure was applied to the linear part of a ball-screw geared to the output shaft such that all power went through meshing gear teeth, necessitating robust construction thereof. In the present invention, torque amplifying hydraulic pressure is applied to a vane motor on the output shaft such that hydraulic power does not pass through gear teeth, enabling a lighter and less costly construction.

3 Claims, 1 Drawing Figure

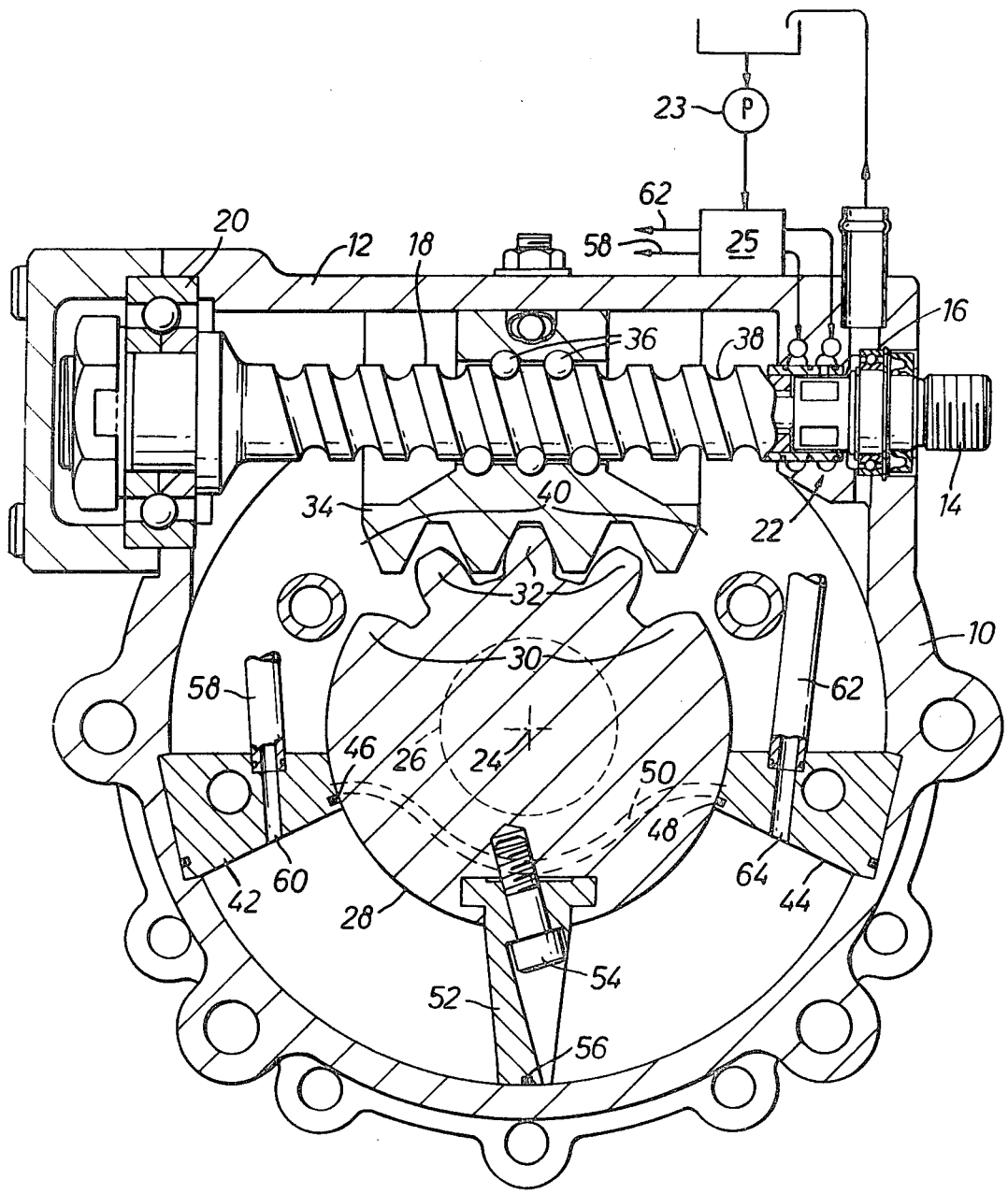

HYDRAULIC POWER-ASSISTED ACTUATING ARRANGEMENTS

This invention relates to hydraulic power assisted actuating arrangements.

The present invention employs an hydraulic power assistance control device of the type wherein a first rotary member is coupled to a second rotary member in such a way that relative rotational displacement between the two members varies the relative magnitudes of two hydraulic pressures and/or varies the relative magnitudes of two hydraulic flow rates, in accordance with the extent of the relative displacement. Such a device is also so constructed that rotation of the first member causes rotation of the second member with said relative displacement constituting lost motion between the first and second members, said lost motion preferably being limited to a small fraction of a revolution. Such a device is hereinafter referred to as "a device of the type described".

The relative motion in a device of the type described may be such that a first hydraulic port or first group of hydraulic ports allows greater or lesser flow of hydraulic fluid through the first port or ports while causing a converse lesser or greater flow (i.e. a change in an opposite sense) through a second hydraulic port or a second group of hydraulic ports, said ports forming a part of the device. The first and second members in one possible form of a device of the type described may be coupled by a tongue on the first member engaging a slightly angularly wider slot in the second member, said ports being formed in one or both faces of the slot, and rocking of the tongue within the slot causing the first port or ports to be closed by the tongue or valve land(s) formed on the tongue while causing the second port or ports to be opened by the tongue or further valve land(s) formed on the tongue, and vice versa.

According to the invention there is provided an hydraulic power assisted actuating arrangement comprising a rotatable input shaft coupled to or integral with the first member of a device of the type described, the second member of said device being coupled to or integral with an input member of a motion translating means, a translated-motion output member of said motion translating means being coupled to or forming part of a rotatable output member of the actuating arrangement, and rotary vane actuator means coupled to or forming part of said rotatable output member, said actuator means having first and second input ports leading to volumes defined between either side of an arcuately movable vane member coupled (without the intermediary of gearing) to or forming part of said rotatable output member and static means closing off said volumes, said first and second ports being coupled to receive first and second hydraulic pressures produced in use by or derived in use from said device in a sense that the torque produced in use by said pressures acting on said vane member augments the torque produced by said rotatable output member upon rotation of said input shaft.

For simplicity and cheapness, said actuator means preferably has only a single said vane member, but it is within the scope of the invention to have a plurality of such vane members interdigitated with suitable static means and suitably provided with hydraulic coupling means whereby each said vane member applies, in use, augmentation torque directly to said rotatable output member.

Preferably said static means is part of a casing or housing of the arrangement and preferably all the movable parts of said arrangement are mounted on or within said casing or housing.

A suitable form of said device capable of directly producing said pressures is the device described in United Kingdom patent application No. 15332/75 (already published as Federal German Offenlegungsschrift No. 2616421).

Alternative suitable forms of said device are described in FIGS. 2–6 or FIGS. 7 and 8 or FIGS. 10(a) and 10(b) or FIGS. 13(a) and 13(b) of United Kingdom Pat. No. 1,431,437, and in United Kingdom patent application No. 10607/76 (to be published as Australian patent application No. 23071/77), but such alternative forms of device do not directly produce said first and second pressures, and therefore in these cases the arrangement further includes a fluid flow divider means, for example as described with reference to FIG. 16 of United Kingdom Pat. No. 1,431,437 or as described in United Kingdom patent application No. 14889/75 (already published as Federal German Offenlegungsschrift No. 2615626), said fluid flow divider means being coupled to the employed one of said alternative forms of said device in sense to control the fluid flow divider means to produce said first and second pressures as two hydraulic outputs thereof.

The motion translating means may be a ball-screw and quadrant type, wherein said input member is a rotatable shaft having a helical groove in the peripheral surface thereof, the translated-motion output member of said motion-translating means is a rotatable member having gear teeth along at least an arcuate section of the periphery thereof, and between said input and output members is an intermediate member encircling said grooved shaft and having recirculating ball means co-operating with said groove to convert rotational movement of said shaft to linear movement of said intermediate member and also having toothed rack means along one exterior edge thereof, the teeth of said rack means co-operating with the teeth on said rotatable member to convert linear movement of said intermediate member into rotary movement of said rotatable member.

In order that the invention may be more clearly understood and readily put into effect, a preferred embodiment of the same will now be described by way of example, with reference to the accompanying drawing, the sole FIGURE of which is a transverse cross-section of the embodiment.

Referring to the drawing, the embodiment comprises a short-axis generally cylindrical cast or moulded or machined housing 10, having secured thereto to complete the enclosure of the internal volume of the housing 10, a cast or moulded or machined casing 12, a combination of housing 10 and casing 12 enclosing an hydraulic power-assisted actuating arrangement about to be described. A rotatable shaft 14 enters the casing 12 wherein it is rotatably supported by a bearing 16. Coaxial with the shaft 14 is a rotatable ball-screw worm shaft 18 supported radially and axially by a double-angular contact ball bearing 20. Coupling the shafts 14 and 18 is an hydraulic power-assistance control device denoted generally by the reference 22. The device 22 receives pressurised hydraulic fluid from a suitable hydraulic pump 23 via an hydraulic fluid flow divider 25 and provides two control back-pressures to the fluid flow divider 25, the divider 25 preferably being mounted on or within the housing 10 or the casing 12. The output of the divider 25 consists of two hydraulic pressures dependent on the relative rotation of the shaft 14 with respect to the shaft 18.

Rotatably mounted in the housing 10 for angular movement about an axis 24, is an output shaft 26 (shown in dashed cross-sectional outline) which is the output member of the arrangement shown in the drawing. Integral with the output shaft 26 is a circular member 28 which has a micro-finished smooth cylindrical peripheral surface, except for a quadrant 30 which is provided with gear teeth 32. Surrounding the shaft 18 is an intermediate member 34 which forms a motion-translating mechanism. The intermediate member 34 encircles the shaft 18 and has a recirculating ball-screw means 36 acting as an input member which cooperates in known fashion with the spiral groove 38 on the shaft 18 to form a ball-screw which translates rotational movement of the shaft 18 into linear movement (left-to-right and vice versa as shown in the drawing) of the member 34. The member 34 is provided with a rack portion 40 whose teeth engage with the teeth 32 on the member 28 to cause the aforesaid linear movement of the member 34 to be translated into rotational movement of the member 28 and hence also rotational movement of the output shaft 26 about its axis 24.

Within the lower half of the housing 10, the volume between the interior surface of the housing 10 and the exterior surface of the member 28 is a part-annulus of rectangular cross-section, this part-annulus constituting a closed volume defined by static means in the form of the housing 10, the member 28 and first and second static vanes 42 and 44 rigidly secured to the housing 10. Conventional rubber or elastomeric plastics seals 46 and 48 substantially prevent leakage of hydraulic fluid out of said closed volume past the static vanes 42 and 44. A similar seal (not shown) is lodged in a meander groove 50 to prevent leakage of hydraulic fluid out of the closed volume past the member 28.

A vane 52 is located within the closed volume and rigidly secured to the member 28 by a bolt 54 to rotate with the member 28. A seal 56 in a groove round the periphery of the vane 52 substantially prevents leakage of hydraulic fluid past the vane 52 from one part of the thus sub-divided closed volume to the other part thereof. It will readily be seen how the movable vane 52 divides the closed volume into two relatively variable volumes which are mutually inversely variable.

A conduit leads hydraulic fluid from the first output of the fluid flow divider 25 via a passage 60 in the static vane 42 to the volume on the left of the movable vane 52. Similarly, a conduit 62 leads hydraulic fluid from the second output of the fluid flow divider 25 via a passage 64 in the static vane 44 to the volume on the right of the movable vane 52.

Rotational movement of the input shaft 14 initially causes a small rotational displacement of the shaft 14 with respect to the shaft 18 and thereby causes the control device 22 to produce differential hydraulic outputs which, in turn, cause the flow divider 25 to produce two different hydraulic pressures as its outputs. These different pressures are conveyed by the conduits 58 and 62, and the passages 60 and 64, to either side of the movable vane 52. This differential pressure in the volumes on either side of the movable vane 52 give rise to a net force on the vane 52 and hence to a rotational force on the member 28 about its axis 24 so tending to rotate the output shaft 26. Thus the arrangement described functions in the manner of the well-known hydraulic reciprocating vane motor or actuator. The pressures in the control device 22 tend to rotate the shaft 18, so that as the shaft 14 is rotated, the shaft 26 tends to follow rotation of the shaft 14 and the shaft 18 follows rotation of the shaft 14. Thereby the member 34 moves to the left or the right and follows rotation of the member 28. The pressures on either side of the vane 52 substantially equalise once the output shaft 26 has followed rotation of the input shaft 14.

In previously proposed power-assistance arrangements, the hydraulic output motor acted on or formed part of the equivalent of the member 34 such that all power was delivered through meshing gear teeth. In contrast, in the present invention, the controlled hydraulic power acts directly on the output shaft 26 without the intermediary of gearing or linkages, thus saving stress on, and wear of the gear teeth, and enabling a lighter and less costly construction of the gearing.

In the event that the supply of pressurised fluid to the control device 22 failed, rotation of the shaft 18 with the device 22 introducing only a marginal amount of rotational lost motion, and the ball-screw and quadrant force-translating mechanism formed by the parts 18, 30, 32, 34, 46, 38 and 40 would directly convert rotation of the input shaft 14 into rotation of the output shaft 26 (the "unassisted" of mode of operation of the described arrangement), so that the arrangement is to this extent "fail-safe".

In place of the devices 22 and 25, the arrangement may employ the torque-sensing and rotation-transmitting device described in U.S. Pat. No. 4,057,079 this device directly producing (without the requirement of the flow divider 25) the requisite hydraulic pressures for direct application to the vane 52 to produce the same output effect as described above.

For the sake of simplicity and cheapness, the essential minimum of one rotatable vane 52 and two static vanes 42 and 44 (as illustrated) is preferred, but it is a practicable alternative form of the invention to have two or more rotatable vanes of which the vane 52 would be one of a plurality of like vanes, each rotatable vane being coupled directly to or integral with the output member 28 and interdigitated with static vanes (of the form of the vanes 42 and 44, or other suitable static means) together with suitable hydraulic pipes and/or passages, all in the annular volume defined between the housing 10 and the cylindrical surface of the member 28, to form a plural-vane rotary actuator.

The described arrangements may be employed in a road vehicle steered by pivoting wheels about a near-vertical axis in customary fashion, the input shaft 14 being coupled to the lower end of a steering column at the upper end of which is the vehicle driver's steering wheel, the output shaft 26 having an arm (not shown) secured thereto to cause rotational movement of the output shaft 26 to be converted, via a linkage (not shown) of known form, into pivoting movement of the steered roadbearing wheels, as is customary in the art of hydraulic power steering of vehicles.

However, the described arrangement is not restricted to use in vehicle power steering, and could be used in any situation where rotational movement, or movement converted to rotational movement, requires the power of such movement to be amplified while retaining full control and stability.

Having thus described our invention what we claim is:

1. A hydraulic power-assisted actuating arrangement comprising:
   (a) a hydraulic control means having a first rotary member and a second rotary member, said first and second rotary members being mutually rotationally coupled to vary the relative magnitudes of two hydraulic values to derive first and second hydraulic pressures in accordance with the relative rotational displacement between said first and second rotary members;
   (b) a motion-translating means having an input member coupled to the second rotary member of said control means to be movable thereby, and said motion-translating means including an output portion movable by rotation of the second rotary member;
   (c) a rotatable actuating member coupled to the movable output portion of said motion-translating means to be rotatable thereby; and
   (d) a rotary vane hydraulic actuator means comprising a part-annular volume defined between static volume-enclosing means and the surface of a movable vane-mounting part of the rotatable actuating member, said part-annular volume being divided into first and second mutually inversely variable volumes by an angularly movable vane mounted on said movable vane-mounting part and directly connected to said rotatable actuating member, and means to convey and admit said first and second hydraulic pressures to said first and second variable volumes respectively to act on opposite major surfaces of said movable vane in such a sense as to produce a net force on said movable vane resulting in application of a torque to said rotatable actuating member in proportion to rotation of the first rotary member of said control means producing relative displacement between said first and second rotary members and tending to turn said rotatable actuating member in the same rotational direction as the rotation of said first rotary member acting through said motion-translating means;

said vane-mounting part having a cylindrical peripheral surface and said static volume-enclosing means sealingly engaging said cylindrical peripheral surface to substantially enclose said part-annular volume.

2. The arrangement of claim 1, wherein said hydraulic control means, said motion-translating means, said rotatable actuating member, and said hydraulic actuator means are mounted within a common casing providing mechanical support and hydraulic fluid retention.

3. The arrangement of claim 2, wherein an interior part of said casing defines a surface of said part-annular volume.

* * * * *